(12) United States Patent
Yu et al.

(10) Patent No.: US 11,460,151 B2
(45) Date of Patent: Oct. 4, 2022

(54) CLAMPING DEVICE AND MOBILE TERMINAL HOLDER

(71) Applicant: SHENZHEN DIYIWEI ELECTRONICS CO., LTD., Guangdong (CN)

(72) Inventors: Fan Yu, Guangdong (CN); Yuchen Zheng, Guangdong (CN)

(73) Assignee: SHENZHEN DIYIWEI ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/315,250

(22) Filed: May 7, 2021

(65) Prior Publication Data
US 2022/0252218 A1 Aug. 11, 2022

(30) Foreign Application Priority Data
Feb. 5, 2021 (CN) .......................... 202120333989.3

(51) Int. Cl.
| | | |
|---|---|---|
| *A47G 1/10* | (2006.01) | |
| *F16M 13/02* | (2006.01) | |
| *B60R 11/02* | (2006.01) | |
| *B60R 11/00* | (2006.01) | |

(52) U.S. Cl.
CPC ........ *F16M 13/022* (2013.01); *B60R 11/0241* (2013.01); *B60R 2011/0003* (2013.01); *B60R 2011/0071* (2013.01); *B60R 2011/0089* (2013.01)

(58) Field of Classification Search
CPC .............. F16M 13/022; B60R 11/0241; B60R 2011/0003; B60R 2011/0071; B60R 2011/0089
USPC ............................ 248/316.4; 455/575.1, 345
See application file for complete search history.

(56) References Cited

U.S. PATENT DOCUMENTS

| | | | |
|---|---|---|---|
| 11,306,535 B2 * | 4/2022 | Lu .............................. | E06B 9/56 |
| 2019/0263326 A1 * | 8/2019 | Yu ...................... | F16M 11/2014 |

* cited by examiner

*Primary Examiner* — Todd M Epps

(57) ABSTRACT

A clamping device and a mobile terminal holder are provided. The clamping device comprising a rotating part, a screw mounted in the rotating part, a nut in threaded connection with the screw, a first and a second clamping parts. One end of the first clamping part is arranged in the rotating part and is connected to the nut, and the other end extends out of the rotating part. The rotating part is sleeved on the second clamping part in a rotatable manner. In use, the rotating part is rotated to drive the screw to rotate, such that the nut moves along the axial direction of the screw, which in turn drives the first clamping part to move along the axial direction of the screw, such that the first clamping part is close to or far away from the second clamping part.

10 Claims, 8 Drawing Sheets

CLAMPING DEVICE AND MOBILE TERMINAL HOLDER

CROSS REFERENCE TO RELATED APPLICATIONS

The present application claims the benefit of Chinese Patent Application No. 202120333989.3 filed on Feb. 5, 2021, the contents of which are incorporated herein by reference in their entirety.

TECHNICAL FIELD

The present invention relates to the technical field of vehicle accessories, and in particular to a clamping device and a mobile terminal holder.

BACKGROUND ART

The vehicle-mounted fixed holder is configured to fix the vehicle-mounted electronic products in a vehicle, the existing vehicle-mounted fixed holder has a variety of forms, the most commonly used vehicle-mounted fixed holder clamps with a clamp, and the vehicle-mounted fixed holder is mounted on a blade of an air outlet of a vehicle.

Specifically, the clamp on the vehicle-mounted fixed holder is generally provided with a fixed clamp, a housing and a moving plate for clamping. During clamping, the housing is rotated to drive the moving plate to move, such that the moving plate is close to or far away from the fixed clamp, thereby clamping or relaxing the blade. To facilitate rotation, a protruding external thread usually needs to be arranged on the moving plate, and an internal thread matched with the external thread is arranged inside the housing. In this way, the moving plate can be moved when the housing is rotated. Alternatively, a screw can also be arranged on the vehicle-mounted fixed holder, the screw is fixed to the housing, and a through hole with internal threads is formed on the axial direction of the moving plate to match with the threads of the screw, such that the housing is rotated to drive the screw to rotate, and then the moving plate is moved. The clamps in the above two vehicle-mounted fixed holders require external or internal threads on the moving plate. In order to match with the housing or the screw, the processing precision of the external or internal threads arranged on the moving plate is required to be high and the machining difficulty is high.

SUMMARY OF THE INVENTION

The technical problem to be solved in the present invention is to provide a clamping device and a mobile terminal holder aiming at the above defects of the prior art, to overcome the problem of high strength of the clamp structure in the existing vehicle-mounted holder and the problem of the exposed threads affecting the beauty.

According to an aspect of the present invention, a clamping device is provided, including a rotating part, a screw, wherein the screw is mounted within the rotating part; a nut, wherein the nut is in threaded connection with the screw; a first clamping part, wherein one end of the first clamping part is arranged in the rotating part and is connected to the nut, and the other end extends from the rotating part; a second clamping part, wherein the second clamping part is clamped in cooperation with the first clamping part, and the rotating part is rotatably sleeved on the second clamping part; wherein the rotating part is rotated to drive the screw to rotate, such that the nut moves along the axial direction of the screw, which in turn drives the first clamping part to move along the axial direction of the screw, such that the first clamping part is close to or far away from the second clamping part.

According to another aspect of the present invention, a mobile terminal holder is provided, including a clamping device as described above, and a clamping mechanism for clamping the mobile terminal, wherein the clamping mechanism is arranged on the clamping device.

The beneficial effect of the present invention is as follows: a screw is arranged inside the rotating part, the first clamping part is in threaded connection with the screw by a nut. When in use, the rotating part is rotated to drive the screw to rotate, such that the nut moves along the axial direction of the screw, which in turn drives the first clamping part to move along the axial direction of the screw, such that the first clamping part is close to or far away from the second clamping part. Compared with the prior art, the screw and the nut in the present invention can both adopt standard parts, and only the first clamping part and the nut need to be fixed during processing, therefore, the processing difficulty is low, the structural strength of the first clamping part is high, and the problem of exposed threads affecting the beauty does not exist.

BRIEF DESCRIPTION OF THE DRAWINGS

The present invention will be further described below in combination with the accompanying drawings and embodiments, in the drawings.

DETAILED DESCRIPTION OF THE EMBODIMENTS

Preferred embodiments of the present invention are described in detail in combination with the accompanying drawings.

Figure 1:
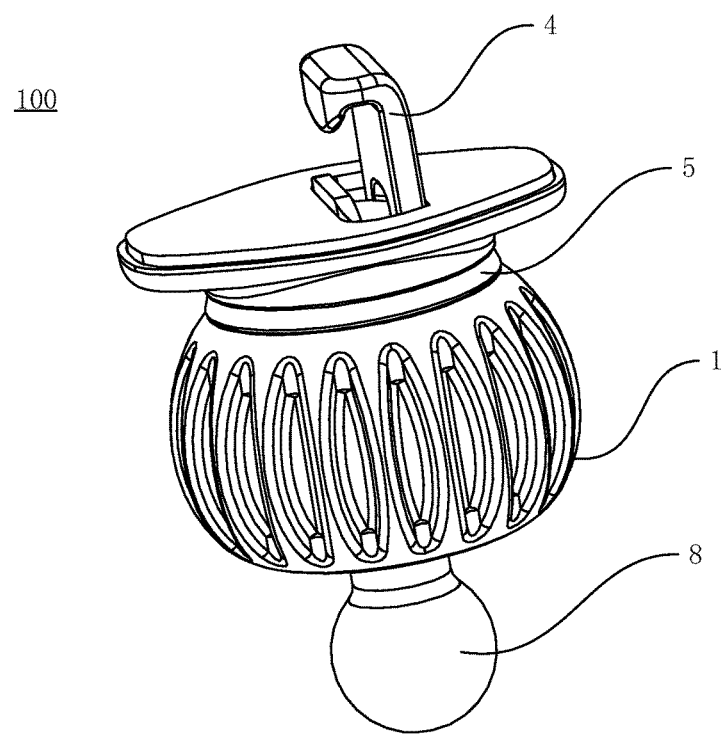
FIG. 1 is a structural schematic diagram of a clamping device according to an embodiment of the present invention.
Figure 2:
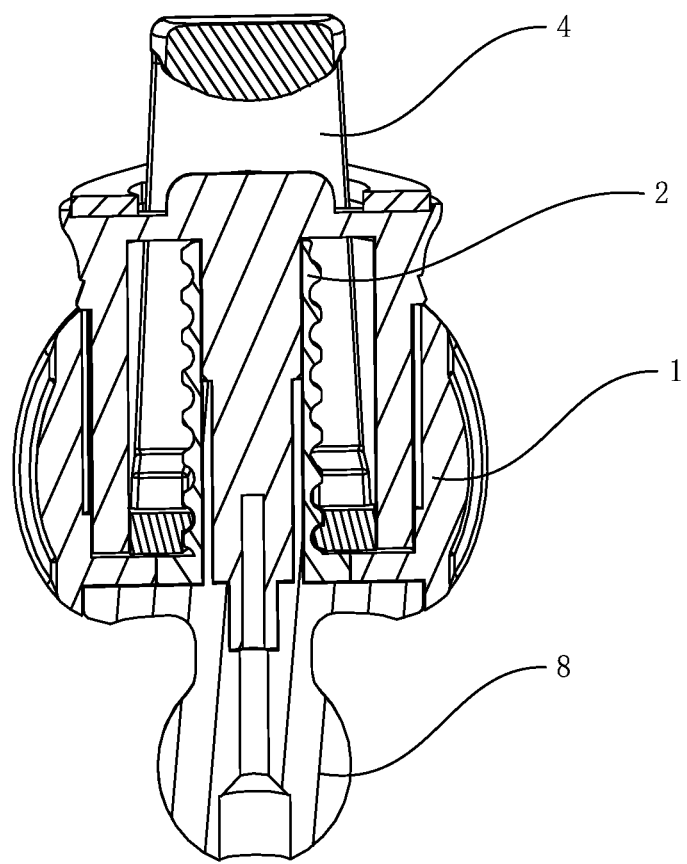
FIG. 2 is a cross-sectional diagram of a clamping device according to an embodiment of the present invention
Figure 3:
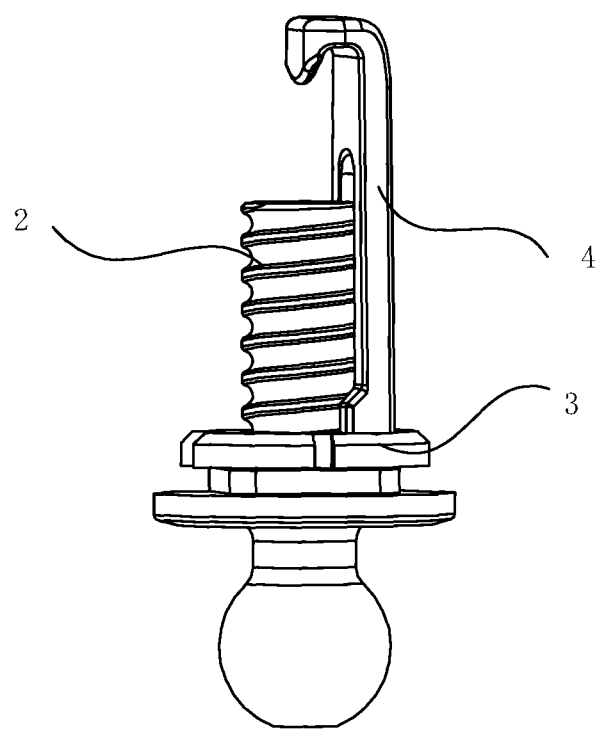
FIG. 3 is a schematic diagram of a structure without a rotating part and a second clamping part according to an embodiment of the present invention.

As shown in FIGS. 1 to 3, the present invention provides a clamping device 100, including a rotating part 1, a screw 2, a nut 3, a first clamping part 4, and a second clamping part 5. The screw 2 is mounted in the rotating part 1, and the nut 3 is in threaded connection with the screw 2. One end of the first clamping part 4 is arranged in the rotating part 1 and is connected to the nut 3, and the other end extends out of the rotating part 1. The second clamping part 5 is clamped in cooperation with the first clamping part 4, and the rotating part 1 is sleeved on the second clamping part 5 in a rotatable manner. Wherein, the rotating part 1 is rotated to drive the screw 2 to rotate, such that the nut 3 moves along the axial direction of the screw 2, which in turn drives the first clamping part 4 to move along the axial direction of the screw 2, such that the first clamping part 4 is close to or far away from the second clamping part 5. Through setting the screw 2 inside the rotating part 1, the first clamping part 4 is in threaded connection to the screw 2 by the nut 3. In use, the rotating part 1 is rotated to drive the screw 2 to rotate, such that the nut 3 moves along the axial direction of the screw 2, which in turn drives the first clamping part 4 to move along the axial direction of the screw 2, such that the first clamping part 4 is close to or far away from the second clamping part 5.

The inventor found through researches that, as to the existing vehicle-mounted fixed holder, whether a manner of "arranging external threads on the moving plate and cooperating with the internal threads inside the housing" or a manner of "arranging a screw and forming a through hole with internal threads on the axial direction of the moving plate to cooperate with the threads of the screw" is adopted, the external or internal threads of the moving plate need to be processed with high precision, and the structural strength of the moving plate will be reduced, and the external or internal threads are easily exposed after the moving plate is extended, which affects the beauty. The screw 2 and the nut 3 in the present invention can both adopt standard parts, and only the first clamping part 4 and the nut 3 need to be fixed during processing, the processing difficulty is low, the structural strength of the first clamping part 4 is high, and the problem of exposed threads affecting the beauty does not exist.

Figure 4:
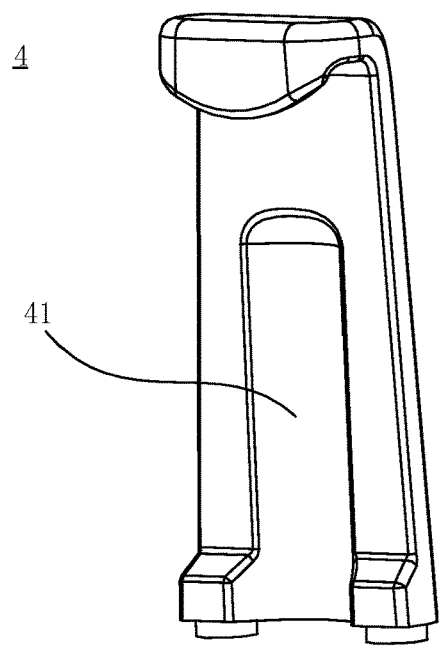
FIG. 4 is a structural schematic diagram of a first clamping part according to an embodiment of the present invention.

Preferably, as shown in FIG. 4, the first clamping part 4 is provided with a first groove 41, and the screw 2 is at least partially arranged in the first groove 41, such that the first clamping part 4 is closer to the axis of the screw 2, i.e., the first clamping part 4 is closer to the geometric center of the clamping device 100, thereby making the clamping more stable.

Figure 5:
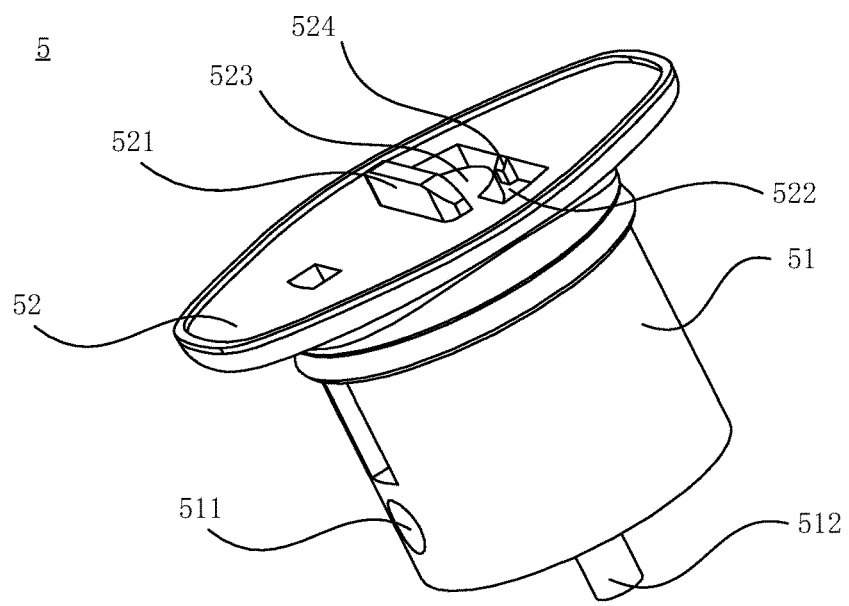
FIG. 5 is a structural schematic diagram of a second clamping part according to an embodiment of the present invention.

Preferably, as shown in FIG. 5, the second clamping part 5 includes a sleeve 51 and a first support plate 52 arranged on the sleeve 51. The first support plate 52 is provided with a clamping block 521 and a through hole 522, and the through hole 522 is communicated with the sleeve 51. The rotating part 1 is sleeved on the sleeve 51, the first clamping part 4 is arranged in the sleeve 51 and protrudes from the through hole 522, the clamping block 521 is set to be opposite to the first clamping part 4, and the screw 2 is arranged in the sleeve 51. In use, the rotating part 1 is rotated to drive the screw 2 to rotate, such that the nut 3 moves along the axial direction of the screw 2, which in turn drives the first clamping part 4 to move along the axial direction of the screw 2, such that the first clamping part 4 is close to or far away from the clamping block 521.

Preferably, as shown in FIG. 4 and FIG. 5, the side wall of the through hole 522 is also provided with a first projection 523, and the first projection 523 at least partially extends into the first groove 41. The cooperation of the first projection 523 and the first groove 41 plays a limiting role, thereby preventing the second clamping part 5 from sliding axially relative to the first clamping part 2, and the first projection 523 can also avoid the first clamping part 4 from moving excessively.

Figure 6:
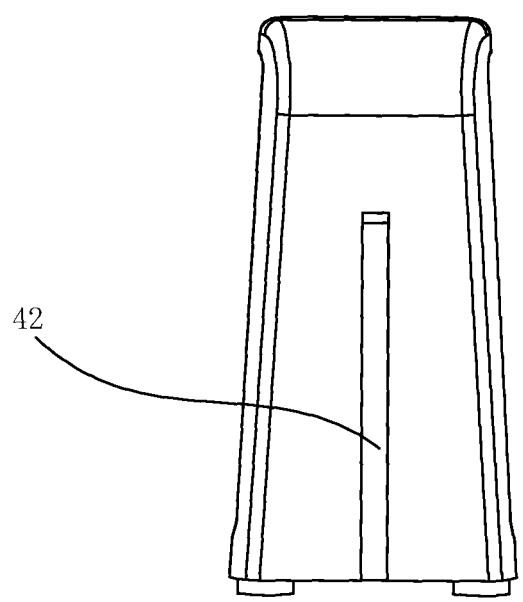
FIG. 6 is another structural schematic diagram of a first clamping part according to an embodiment of the present invention.

Preferably, as shown in FIG. 6, in order to enhance the limiting effect, the side wall of the through hole 522 is also provided with a second projection 524, the second projection 524 is set to be opposite to the first projection 523, and the first clamping part 4 is also provided with a second groove 42 which is matched with the second projection 524, and the second projection 524 is at least partially extended into the second groove 42.

Figure 7:
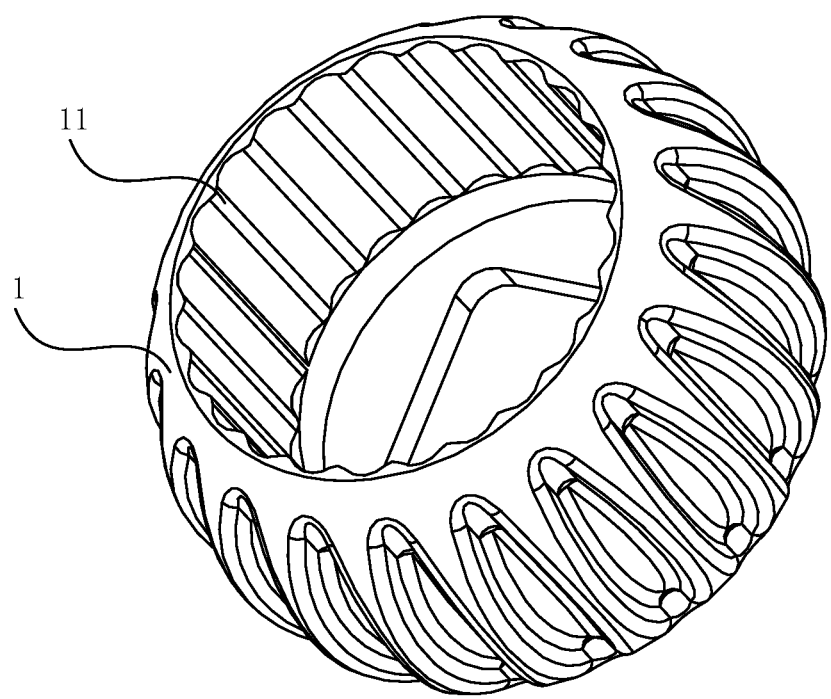
FIG. 7 is a structural schematic diagram of the rotating part according to an embodiment of the present invention.
Figure 8:
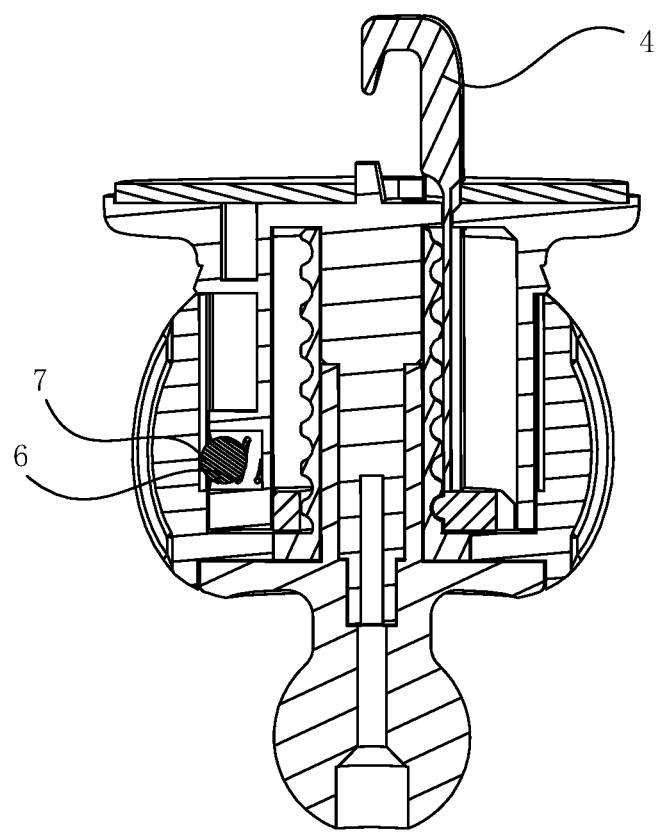
FIG. 8 is another cross-sectional diagram of a clamping device according to an embodiment of the present invention.

Preferably, as shown in FIG. 7 and FIG. 8, the inner wall of the rotating part 1 is provided with a number of convex ribs 11. As shown in FIG. 5 and FIG. 8, the sleeve 51 is formed with a concave part 511, and the concave part 511 is internally provided with an elastic piece 6 and a clamping block 7, and the elastic piece 6 is connected to the second clamping part 5 at one end and connected to the clamping block 7 at the other end, and the clamping block 7 is abutted against the rotating part 1. Specifically, during clamping, the clamping block 7 is arranged between two adjacent convex ribs 11. When the rotating part 1 is rotated, the convex rib 11 is abutted against the clamping block 7, to compress the elastic piece 6. During clamping, the clamping block 7 is arranged between two adjacent convex ribs 11, to avoid rotation of the rotating part 1. In the present embodiment, the elastic piece 6 is a spring.

Preferably, as shown in FIG. 1, the clamping device 100 further includes a connecting part 8, one end of the connecting part 8 is connected to the side, far away from the first clamping part 4, of the second clamping part 5. The other end of the connecting part 8 extends from the rotating part 1, and is arranged on each side of the rotating part 1 with the first clamping part 4.

Figure 9:
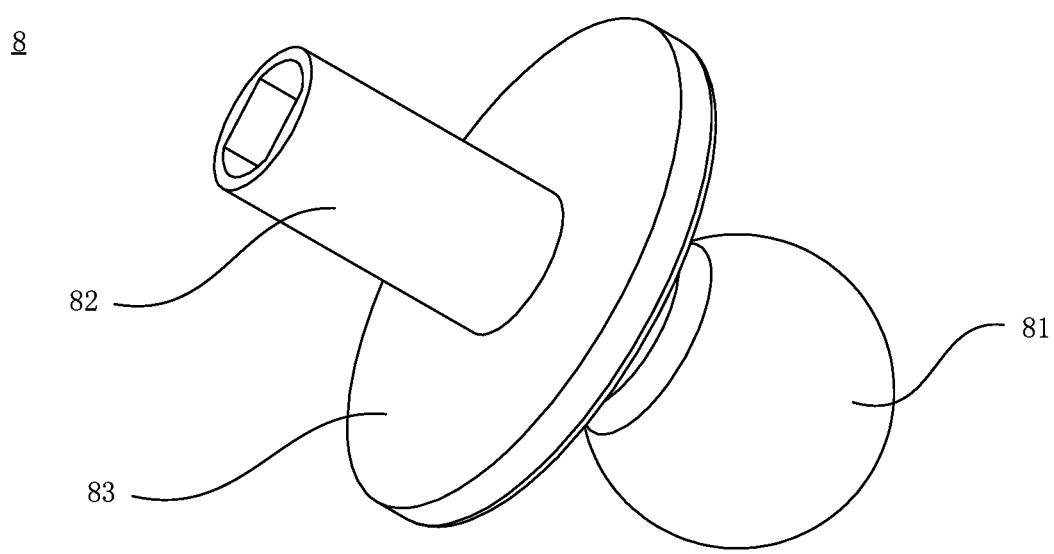
FIG. 9 is a structural schematic diagram of a connector according to an embodiment of the present invention.

Preferably, as shown in FIGS. 5 and 9, the sleeve 51 is internally provided with a first connecting rod 512, and the connecting part 8 includes a connector 81 and a second connecting rod 82. One end of the second connecting rod 82 is fixedly connected with the connector 81, and the other end is fixedly connected with the first connecting rod 512. The screw 2 is a hollow structure, and can be sleeved on the shaft formed by the first connecting rod 512 and the second connecting rod 82 in a rotatable manner.

Preferably, the connection part 8 further includes a second support plate 83, the connector 81 and the second connecting rod 82 are respectively fixed on both sides of the second support plate 83, the second support plate 83 supports the rotating part 1, and the rotating part 1 is arranged between the second support plate 83 and the first support plate 52.

The present invention further provides a mobile terminal holder, including a clamping device 100 as described above and a clamping mechanism for clamping a mobile terminal, wherein the clamping mechanism is arranged on the clamping device. Specifically, in the present embodiment, the clamping mechanism is mounted on a connector 81.

It should be understood that, the above embodiments are only used to illustrate the technical solution of the present invention, rather than limiting the technical solution of the present invention. To a person skilled in the art, the technical solutions recorded in the above embodiments can be modified, or some of the technical features can be substituted equivalently; and all such modifications and substitutions shall all fall within the protection scope of the claims appended to the present invention.

The invention claimed is:
1. A clamping device, comprising:
a rotating part,
a screw, wherein the screw is mounted in the rotating part;
a nut, wherein the nut is in threaded connection with the screw;

a first clamping part, wherein one end of the first clamping part is arranged in the rotating part and is connected to the nut and another end extends out of the rotating part;

a second clamping part, configured to clamp in cooperation with the first clamping part, wherein the rotating part is sleeved on the second clamping part in a rotatable manner; and wherein the rotating part is configured to be rotated to drive the screw to rotate, such that the nut moves along an axial direction of the screw, which in turn drives the first clamping part to move along the axial direction of the screw, such that the first clamping part is close to or far away from the second clamping part.

2. The clamping device of claim 1, wherein the first clamping part is provided with a first groove, and the screw is at least partially arranged in the first groove.

3. The clamping device of claim 2, wherein the second clamping part comprises a sleeve and a first support plate arranged on the sleeve, the first support plate is provided with a clamping block and a through hole, the through hole is communicated with the sleeve; the rotating part is arranged on the sleeve, the first clamping part is arranged in the sleeve and protrudes from the through hole, the clamping block is set to be opposite to the first clamping part, and the screw is arranged inside the sleeve.

4. The clamping device of claim 3, wherein a side wall of the through hole is further provided with a first projection which extends at least partially into the first groove.

5. The clamping device of claim 4, wherein the side wall of the through hole is further provided with a second projection, the second projection is set to be opposite to the first projection, the first clamping part is further provided with a second groove matched with the second projection, and the second projection extends at least partially into the second groove.

6. The clamping device of claim 5, wherein an inner wall of the rotating part is provided with a number of convex ribs; the sleeve is provided with a concave part, the concave part is provided with an elastic piece and a clamping block, the elastic piece is connected to the second clamping part at one end and connected to the clamping block at the other end, the clamping block is abutted against the rotating part; and during clamping, the clamping block is arranged between two adjacent convex ribs.

7. The clamping device of claim 3, wherein the clamping device further comprises a connecting part, one end of the connecting part is connected to a side, far away from the first clamping part-4, of the second clamping part, and the other end of the connecting part extends from the rotating part and is arranged on both sides of the rotating part respectively with the first clamping part.

8. The clamping device of claim 7, wherein the sleeve is provided with a first connecting rod, the connecting part comprises a connector and a second connecting rod, one end of the second connecting rod is fixedly connected to the connector and another end is fixedly connected to the first connecting rod; and the screw is a hollow structure, and is sleeved on a shaft formed by the first connecting rod and the second connecting rod in a rotatable manner.

9. The clamping device of claim 8, wherein the connecting part further comprises a second support plate, the connector and the second connecting rod are respectively fixed on two sides of the second support plate, the second support plate supports the rotating part, and the rotating part is arranged between the second support plate and the first support plate.

10. A mobile terminal holder, comprising the clamping device of claim 1 and a clamping mechanism for clamping a mobile terminal, wherein the clamping mechanism is arranged on the clamping device.

* * * * *